UNITED STATES PATENT OFFICE.

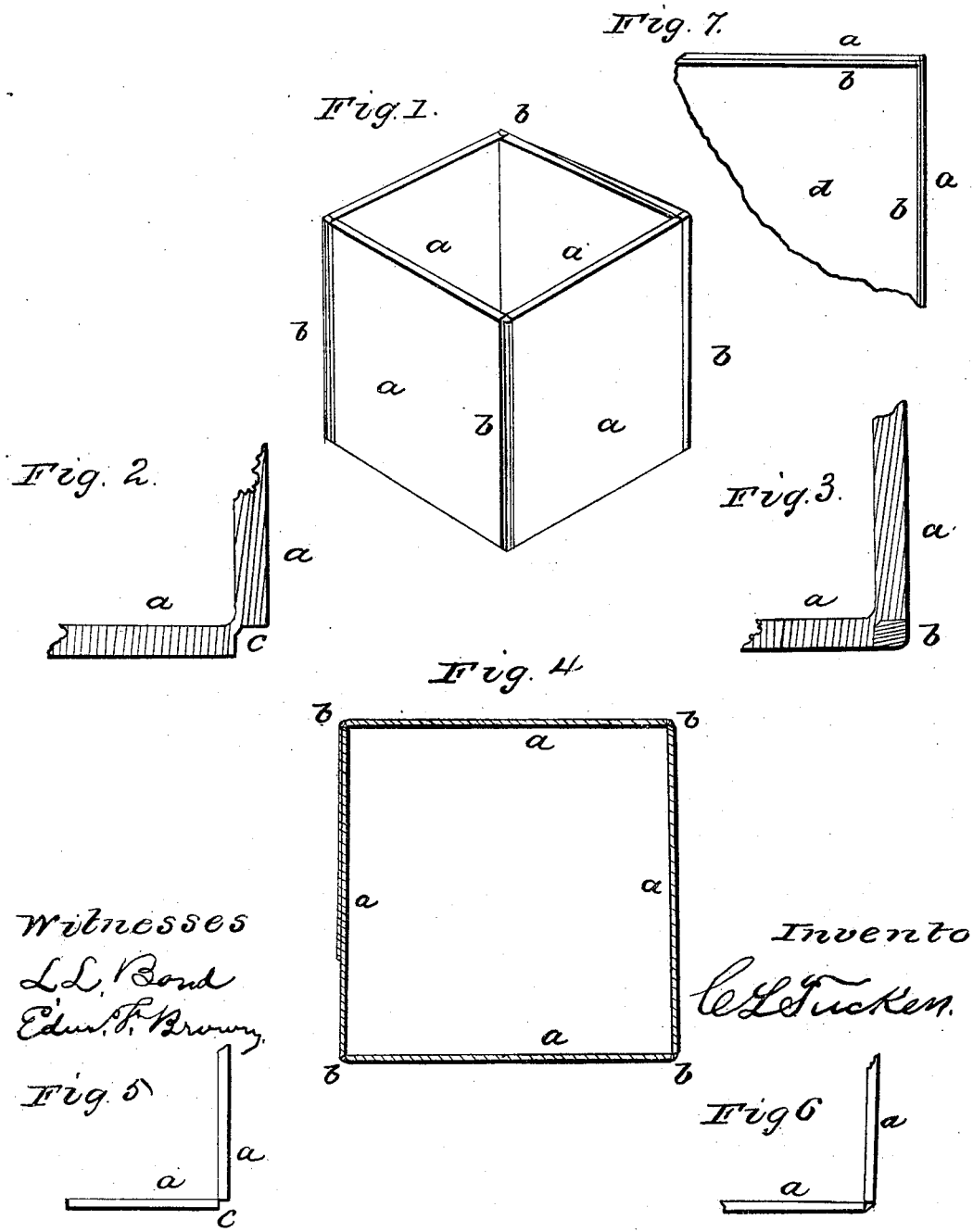

CHARLES L. TUCKER, OF CHICAGO, ILLINOIS.

IMPROVEMENT IN CEMENTING AND STRENGTHENING BOXES FOR PACKING LARD AND OTHER SUBSTANCES.

Specification forming part of Letters Patent No. 81,229, dated August 18, 1868.

*To all whom it may concern:*

Be it known that I, CHARLES L. TUCKER, of the city of Chicago, in the county of Cook and State of Illinois, have invented certain new and useful Improvements in Cementing or Strengthening Boxes Made of Thin Material; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

In the drawings, Figure 1 represents a box in perspective, showing cement applied at the corners; Figs. 2 and 5, sections of one corner, showing the openings; Figs. 3 and 6, similar sections, with cement applied; Fig. 4, a top view of a box; and Fig. 7, a broken section, showing cement applied to the heads.

Angular boxes, when made of thin material, such as veneers or pasteboard, are usually made by cutting or scoring across where the angle is to be formed. This scoring in veneers is usually made by cutters attached to the knife by which they are cut from the block or bolt, and the cuts or scores are usually made about two-thirds of the distance through the veneers. This, while it is of great advantage in forming boxes, makes them weak at the angles or corners, and injures the boxes when they are to be filled with any substance which requires the support of the box to keep it in place, or which produces an internal pressure on the box; and in fitting in the heads it is found practically very difficult to fit them in such thin material so closely that they will adhere to all parts of the shell by the use of glue, with or without tacks, and consequently openings or holes are left at the corners of such heads, and also wherever there is any defect in material or in construction.

The nature and object of my invention consist in overcoming these difficulties and defects by the use and application of a cement which will have a sufficient body to fill the score-openings and the imperfections in the fit or in the construction, and thereby make the boxes tight, and of sufficient strength to resist internal pressure.

*a* represents the sides of a rectangular box, formed with its angles turned on scores, and *b* the adhesive cement-filling in the score or opening *c* formed by the turn.

If the score is made with a saw, or other instrument which removes a portion of the material when turned or bent, the opening will be formed as shown at *c*, Fig. 2. If made by drawing a knife or cutters across, the opening will be formed as shown at *c*, Fig. 5.

In filling or cementing the score-openings, it will usually be found sufficient to fill them as shown at *b*, Fig. 6; but if the material used for making boxes is of any considerable thickness, it will improve their appearance to bring the cement-filling out, as shown at *b*, Fig. 3.

For the purpose of strengthening the corners at or in the scoring, any gelatinous or adhesive cement or composition will answer for many uses of the box; and for cementing and filling or partially filling the score-openings, I do not limit myself to any particular cement or filling; but as the principal use of my boxes is designed for butter, lard, and other oleaginous substances, a cement which will resist the action of the oils and the watery particles in butter will be preferable for the score-openings, and is necessary for the heads *d* and imperfections in construction, to prevent leakage.

A variety of cements which will answer the required conditions can be made. I usually use one made of two parts flour, one part glue, and two parts terra-alba or other earthy substance, with a small portion of glycerine added. For butter, however, resin, or a gum insoluble in water, will be preferable in place of glue, and when used the flour can be omitted.

The cement may be applied to scorings or interstices by a brush, by dipping the boxes into a cement-bath, or by any other convenient mode.

By thus filling the scorings with a cement, all of the advantages of scoring in forming the boxes are retained without materially weakening the boxes, as they are found to be nearly as strong as cylindrical ones made of the same material. The same cement also fills and stops any cracks or holes which may be formed in bending scored veneers where the wood is cross-grained or slightly decayed. And by applying a non-soluble cement to the joints of the heads *d*, which has a sufficient body to permanently close all interstices or openings caused by imperfections in the fitting of the heads or in the material, and make the parts adhere, and to that extent strengthen the box, a cheap and perfectly tight wood box is thereby formed.

The non-leaking character of the box is improved by an interior surfacing or coating, such as is described in another application filed with this application, or in a patent granted to me July 2, 1867, and reissued, to which said patent reference is made for the construction of the box, so far as the sides *a* and heads *d* are concerned.

Having thus fully described my invention, what I claim as new, and desire to secure by Letters Patent, is—

1. Filling the score-openings of angular boxes with cement, substantially as and for the purposes specified.

2. Filling the interstices or openings caused by imperfect construction or material in thin wood boxes with an insoluble cement, so that the boxes are strengthened and made tight at the same time, substantially as specified.

3. As a new article of manufacture, tight or non-leaking angular boxes, when the sides *a* are made of veneers or thin wood, and cemented, substantially as described.

CHARLES L. TUCKER.

Witnesses:
L. L. BOND,
EDM. F. BROWN.